No. 765,350. PATENTED JULY 19, 1904.
F. F. WILSON.
MOLDING MACHINE.
APPLICATION FILED JUNE 6, 1903.
NO MODEL. 2 SHEETS—SHEET 1.

WITNESSES:
Fred White
Rene Bruine

INVENTOR:
Fergus F. Wilson,
By Attorneys,
Arthur C. Dreser & Co.

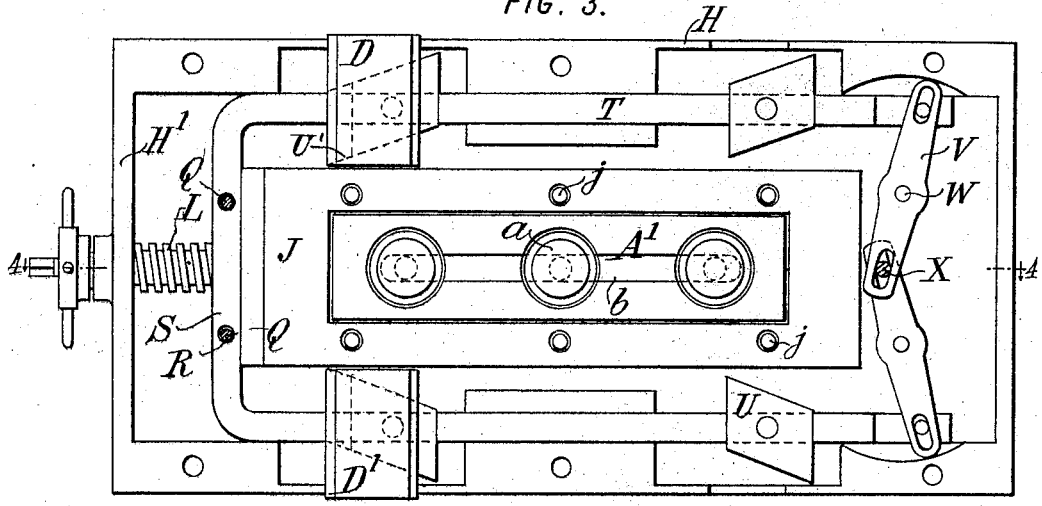
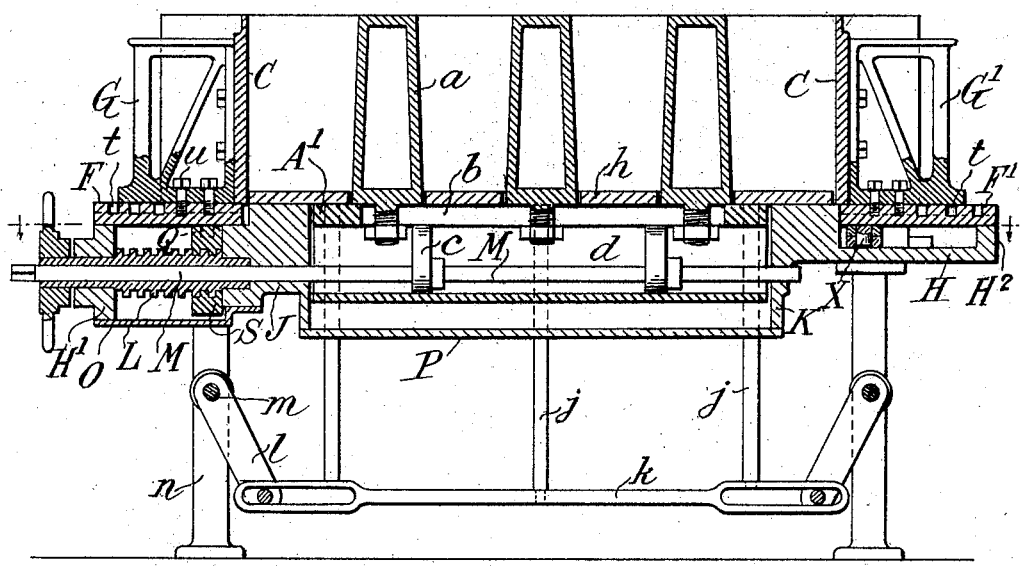
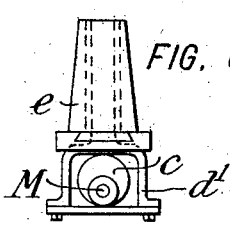
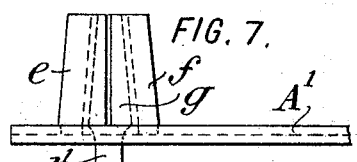
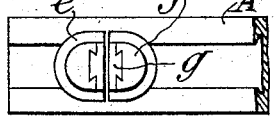

No. 765,350. Patented July 19, 1904.

UNITED STATES PATENT OFFICE.

FERGUS F. WILSON, OF NEW YORK, N. Y.

MOLDING-MACHINE.

SPECIFICATION forming part of Letters Patent No. 765,350, dated July 19, 1904.

Application filed June 6, 1903. Serial No. 160,308. (No model.)

*To all whom it may concern:*

Be it known that I, FERGUS F. WILSON, a citizen of the United States, residing in the borough of Brooklyn, county of Kings, city and State of New York, have invented certain new and useful Improvements in Molding-Machines, of which the following is a specification.

My invention aims to provide certain improvements in molding-machines specially adapted for the making of artificial stone from plastic mixtures, such as cement and sand or broken stone. The improvement is also adapted for use with various other compositions and for making various other articles.

My improved machine possesses numerous features of advantage over those at present in use. The mechanism is well protected from dirt. The walls of the mold are locked in the positions to which they are moved and are held rigidly, so that they will not spring or spread open with the tamping of the plastic material. The entire device is very cheap and possesses various advantages in operation not found in molds at present in use.

The particular features of novelty are referred to in the claims hereinafter.

The accompanying drawings illustrate an apparatus embodying the invention.

Figure 1:
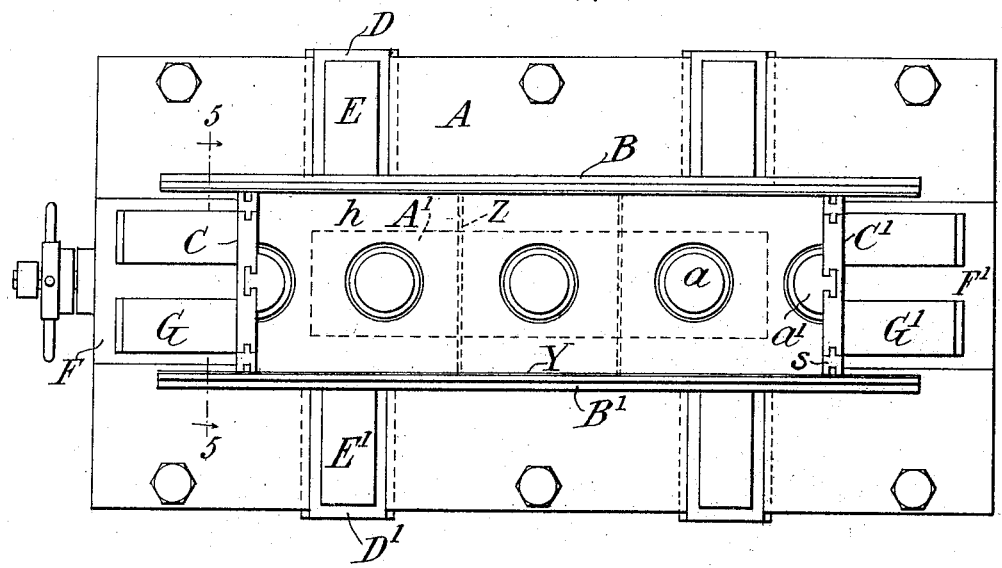
Figure 2:
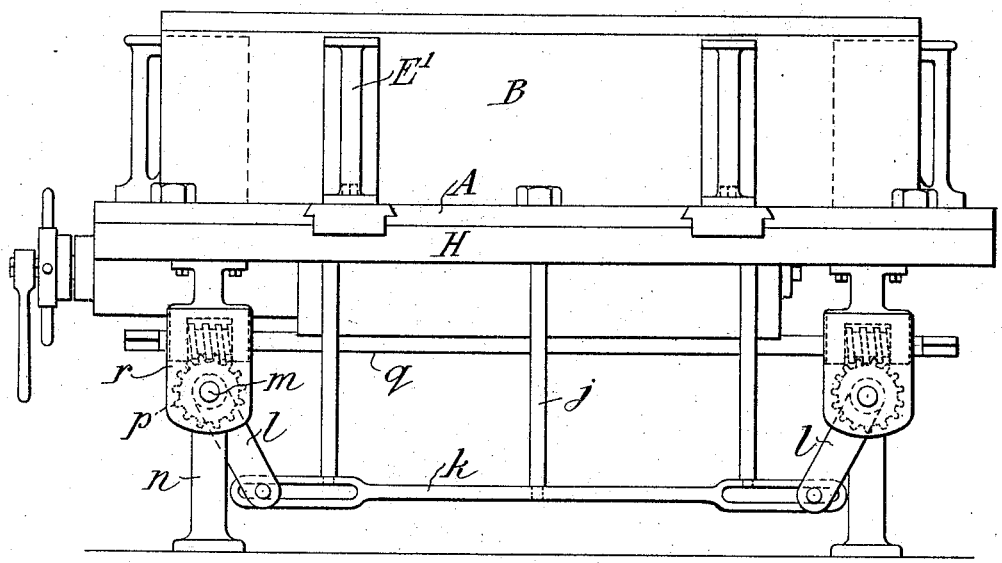
Figure 5:
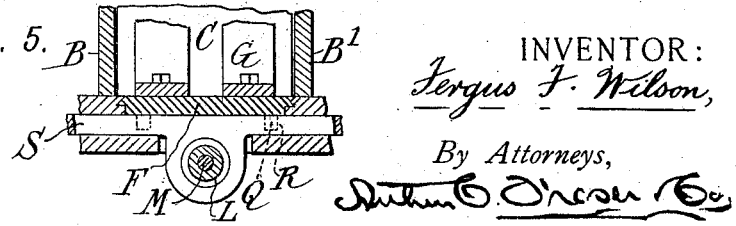

Figure 1 is a plan of a complete apparatus. Fig. 2 is a side elevation. Fig. 3 is a plan of the mechanism for operating the sides and ends. Fig. 4 is an approximately central longitudinal section. Fig. 5 is a section on the line 5 5 of Fig. 1. Figs. 6, 7, and 8 are end and side elevations and a plan, respectively, illustrating an expanding core.

On the base H of the mold are arranged the side walls B B' and the end walls C C'. The side walls are mounted, respectively, on slides or other suitable carriers D D' and are provided with braces E E', the ends being mounted on similar slides F F', each of which is provided with a pair of similar braces G G'. The said slides reciprocate in grooves in the base H, as shown. The base H is provided with a sort of raised frame $H^2$, extending around the edge, as shown. The portion of the apparatus which carries the cores (where cores are used) may be separately made, as shown, consisting of a plate A', to which the cores are bolted or otherwise attached. The main operating-shaft is a hollow worm L, which is provided with bearings in the end H' of the base H and in the intermediate portion J thereof. Through the main operating-shaft there passes a core-operating shaft M, having its rear end bearing in the depending portion K of the base. Extending across the opening below and at the sides of the bearings H' and J is a plate of sheet-metal or the like O, and covering the open space between the bearings J and K is a similar plate P. The plates O and P may be integral with or otherwise fastened to the base H. A cover-plate A is bolted on the top of the base H, protecting the mechanism from dirt and also serving to hold down the slides.

The mechanism for operating the mold-walls is as follows: The slides D D' and F F' are guided in suitable grooves in the base and the cover-plate. The slide F, Fig. 5, is connected by a pair of pins Q with holes R on a transverse bar S, which is internally threaded about the worm L and is therefore reciprocated as the worm is turned. The bar S is connected with two bars T, extending along the side of the machine and mounted in sliding bearings, as shown. The bars T carry cams or wedges U, which engage with oblique grooves U' on the under side of the slides D and D', (two of which are shown in position in Fig. 3.) The ends of the bars T are connected to levers V, pivoted at W and slotted at their inner ends to engage a pin X, depending from the under side of the slide F'. Thus the two sides and two ends of the mold are all operated simultaneously from the shaft L. This being a worm-shaft, the walls are held firmly in any position to which they are moved. The pitch of the cams U is such that the movement of the sides of the mold is very much slower than that of the ends. This permits of making slight variations in the length of stones with so slight a difference in width as to be substantially inappreciable. Thus one pair of sides B B' may be used with a pair of ends C C' of substantially the width of the desired stones, the sides projecting beyond the ordinary length, so that a considerable variation in length can be accomplished without taking off the sides and substituting a new pair, as is necessary with machines now in use. It is understood, however, that the sides and ends of the mold are removable, so that different sizes may be substituted for each other, the walls being preferably bolted, as shown in Fig. 4, to the braces G.

The walls B B' or C C' of the mold may be provided with facing-plates Y to form any desired pattern on the face of the stone—as, for example, to make it an imitation of any suitable style of stone-dressing. Also spacing-plates Z may be provided at any suitable intervals to permit the making of two or more stones in one mold.

It is common to employ cores at the central portion of large stones, and these may be arranged in a variety of ways. I have shown three cores $a$, bolted in suitable position by means of bolts passing through a slot $b$ in the plate A'. These cores are tapered, so that they may be loosened from the stone by lowering them slightly. For moving the cores up and down the shaft M is provided with eccentrics $c$, working in frames, such as $d$, Fig. 4, on the under side of the plate A'. The core-operating shaft M projects through and beyond the outer end of the main shaft L and is provided with a squared head, to which a crank may be connected. Instead of raising and lowering the cores they may be made to expand and contract. Such cores are illustrated in Figs. 6, 7, and 8 and are composed of two parts $e\,f$, engaging a central member $g$, which is raised and lowered by the eccentrics $c$ of the shaft M within eccentric straps or frames $d'$ and which thus spread apart or draw together the parts $e\,f$ of the core.

For ejecting the stone from the mold I preferably provide an ejecting-plate $h$, which rests on the base of the mold and which is engaged on its under side by a number of pins $j$, projecting up at each side, as shown in Fig. 3. The several pins $j$ at their lower ends engage a frame $k$, which is raised and lowered by the swinging of arms $l$, which engage slots at the ends of the frame $k$. The arms $l$ are mounted on shafts $m$, extending across the machine and having bearings in legs $n$. On one side of the machine, outside of the legs $n$, is a pair of worm-gears $p$, operated from the worm-shaft $q$, each gear and worm being incased in a sheet-metal casing $r$ to prevent the entrance of dust and dirt.

The operation of the various parts of my improved apparatus being clear, I will briefly describe the operation of the apparatus as a whole. The size and face-design of the stone to be made being determined, suitable end and side walls are set in place and the shaft L turned to bring them exactly to position. The plastic mixture is then filled in and tamped. As soon as the cement has set sufficiently to remove the stone the cores are lowered or collapsed and the walls are spread out by reversing the movement of the worm-shaft L. The shaft $q$ is then turned to lift the ejecting-plate, with the stone on it.

Instead of substituting new end pieces for stones varying in width the variation may be made up by adding distance-pieces $s$ on the ends of the end walls C C'. The cores may be lowered either before or simultaneously with the lifting of the ejecting-plate. The worms and gears provided are of such a construction as to lend themselves readily to the inclosing casings, which protect them from dirt. The entire machine is very cheap, nearly all the parts being castings and there being very few cut gears or the like. There may also be added at the ends half-cores $a'$, connected by a tongue and groove or otherwise to the end pieces C C'. Different sizes of ejecting-plates $h$ will be used where there is a considerable difference in the size of the stones molded; but an accurate fit of the ejecting-plate is not necessary. This plate, though called an "ejecting-plate," serves also the important function of covering the core-operating mechanism and protecting it to a great extent from dust and dirt. It may also be used, therefore, merely as such a cover-plate and without the lifting-pins $j$ and connected mechanism.

It may be desired to arrange spacing-plates Z across the central cores instead of between them, as shown. In such case the cores themselves, in Fig. 4, or the central members $g$ thereof, in Figs. 7 and 8, may be slotted transversely, as shown in the latter figures. The plates will be held firmly in such slots while the material is being tamped or molded and will be released therefrom as the core is lowered or collapsed.

Various other arrangements of the mold-walls besides those shown may be used without modifying the other parts of the mechanism. For example, the well-known arrangement in which each of the walls overlaps the next at one end may be used.

A small movement of the cores is advantageous in that it permits of the employment of the very compact eccentric operating mechanism shown, which can be easily incased and which, at any rate, is not much interfered with by dirt and is operated by a single half-turn of the shaft. It is to be noted also that the cores can be changed from one to the other position by merely giving the shaft a half-turn in either direction, so that no care or skill is necessary. The mechanism is so compact that it lends itself readily to being inclosed, as shown, and thus protected from dirt. Furthermore, the parts are quite open, so that grit or dirt cannot lodge permanently in them and affect the operation. Though small, the mechanism effects as great a movement of the cores as do much more cumbersome and large mechanisms in use. Furthermore, the gradual separation of the core from the freshly-molded stone which is effected is also a decided advantage of eccentric mechanism over racks and pinions or similar mechanisms which have been used. The rate of movement of the core with an eccentric at the beginning is very slow and only increases after the core is separated from the concrete. With a rack and pinion the movement starts suddenly and is very apt to injure the soft concrete and carry away portions of it. I may, indeed, combine the constructions of Figs. 4 and 6 by putting additional eccentrics on the shaft M and connecting them with the cores, so that the rotation of the shaft will both collapse and lower the cores, and thus free them by a considerable distance from the molded stone. A specific mechanism for this purpose is illustrated and claimed in my application Serial No. 172,470, filed September 9, 1903.

While the movement of the slides D D' F F' is comparatively limited by reason of the slow-motion mechanism employed, it is to be observed that the size of the blocks which can be molded is not similarly limited. The movement controlled by the operating mechanism is intended, primarily, to separate the walls just sufficiently to release the stone and permit it to be ejected. Large variations in the size of the stone to be built are made by adjusting the position of the braces E E' and G G' on their slides. This adjustment, for example, may be made, as illustrated in Fig. 4, by forming the slides with a number of screw-sockets $t$, into which the fastening-bolts $u$ for the slides screw. The mold-walls of course move with the braces G. The plate $h$ is varied in size to fit the new size of stone to be molded.

Though I have described with great particularity of detail an apparatus embodying my invention, yet it is to be understood that the invention is not limited to the specific apparatus shown and described. Various modifications of the same may be made by those skilled in the art without departure from the invention.

What I claim is—

1. In an artificial-stone mold in combination, side and end walls, and mechanism for simultaneously moving said walls one set at a faster rate than the other set.

2. In an artificial-stone mold in combination, a core, an operating-shaft therefor, and a shaft for operating the mold-walls and through which the core-operating shaft passes.

3. In an artificial-stone mold in combination, side walls, bars T carrying wedges U arranged to operate said side walls, and means for simultaneously moving said bars T.

4. In an artificial-stone mold in combination, side and end walls, bars T carrying wedges for operating said side walls, a bar S connecting said bars T and connected to one of the end walls, a lever V for transmitting the movement of the bars T to the opposite end wall, and means for reciprocating said bars T and S.

5. In an artificial-stone mold in combination, a pair of side walls B B', a pair of end walls C C', the former projecting beyond the latter at each end, and means for moving said walls simultaneously, the end walls faster than the side walls.

6. In an artificial-stone mold in combination, an ejecting-plate, a number of lifting-pins engaging the under side of the same, a slotted frame $k$ engaging the lower end of said lifting-pins, swinging arms $l$ engaging the slots in said frame, a shaft $q$, and gears at each end thereof for operating the swinging arms $l$.

7. In an artificial-stone mold in combination, an ejecting-plate, a number of lifting-pins engaging the under side of the same, a slotted frame $k$ engaging the lower end of said lifting-pins, swinging arms $l$ engaging the slots in said frame, a shaft $q$, gears at each end thereof for operating the swinging arms $l$, and a casing $r$ protecting each of said gears from dirt.

8. In an artificial-stone mold, in combination, a base H, slides and mechanism for operating them carried on top of said base for carrying the mold-walls, and a plate A on said base holding down said slides and protecting said mechanism from dust and dirt.

In witness whereof I have hereunto signed my name in the presence of two subscribing witnesses.

FERGUS F. WILSON.

Witnesses:
DOMINGO A. USINA,
THEODORE T. SNELL.